United States Patent
Wang et al.

(10) Patent No.: US 9,202,144 B2
(45) Date of Patent: Dec. 1, 2015

(54) REGIONLETS WITH SHIFT INVARIANT NEURAL PATTERNS FOR OBJECT DETECTION

(71) Applicant: NEC Laboratories America, Inc., Princeton, NJ (US)

(72) Inventors: Xiaoyu Wang, Sunnyvale, CA (US); Yuanqing Lin, Sunnyvale, CA (US); Will Zou, Princeton, NJ (US); Miao Sun, Princeton, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 0 days.

(21) Appl. No.: 14/517,211

(22) Filed: Oct. 17, 2014

(65) Prior Publication Data
US 2015/0117760 A1  Apr. 30, 2015

Related U.S. Application Data

(60) Provisional application No. 61/897,421, filed on Oct. 30, 2013, provisional application No. 62/030,675, filed on Jul. 30, 2014.

(51) Int. Cl.
*G06K 9/00* (2006.01)
*G06K 9/66* (2006.01)

(52) U.S. Cl.
CPC .......................................... *G06K 9/66* (2013.01)

(58) Field of Classification Search
CPC ....... G06K 9/00201; G06K 9/66; G01S 17/93; G01S 17/936; G01S 7/4806; G01S 7/4808; G01S 17/06; G01S 17/58; B60W 30/095; G08G 1/167; G08G 1/168; G08G 1/166
See application file for complete search history.

(56) References Cited

U.S. PATENT DOCUMENTS

| | | | | |
|---|---|---|---|---|
| 5,604,820 A | * | 2/1997 | Ono | G06K 9/00268 382/157 |
| 2004/0258297 A1 | * | 12/2004 | Yeh | G01B 11/2509 382/154 |

* cited by examiner

*Primary Examiner* — Brian Le
(74) *Attorney, Agent, or Firm* — Joseph Kolodka

(57) ABSTRACT

Systems and methods are disclosed for detecting an object in an image by determining convolutional neural network responses on the image; mapping the responses back to their spatial locations in the image; and constructing features densely extract shift invariant activations of a convolutional neural network to produce dense features for the image.

19 Claims, 10 Drawing Sheets

(a) Input image path   (b) Feature maps   (c) Feature vector with location (b) Output the dense neural patterns (a) Convolution with a stride of $m \times 16$ pixels

REGIONLETS WITH SHIFT INVARIANT NEURAL PATTERNS FOR OBJECT DETECTION

This application claims priority to Provisional Applications 61/897,421 filed Oct. 30, 2013 and 62/030,675 filed Jul. 30, 2014, the contents of which are incorporated by reference.

BACKGROUND

Detecting generic objects in high-resolution images is one of the most valuable pattern recognition tasks, useful for large-scale image labeling, scene understanding, action recognition, self-driving vehicles and robotics. At the same time, accurate detection is a highly challenging task due to cluttered backgrounds, occlusions, and perspective changes. Predominant approaches use deformable template matching with hand-designed features. However, these methods are not flexible when dealing with variable aspect ratios. Regionlets have been used for generic object detection and extends classic cascaded boosting classifiers with a two-layer feature extraction hierarchy which is dedicatedly designed for region based object detection. The innovative framework is capable of dealing with variable aspect ratios, flexible feature sets, and improves upon Deformable Part-based Model in terms of mean average precision. Despite the success of these sophisticated detection methods, the features employed in these frameworks are still traditional features based on low-level cues such as histogram of oriented gradients (HOG), local binary patterns (LBP) or covariance built on image gradients.

As with the success in large scale image classification, object detection using a deep convolutional neural network also shows promising performance. The dramatic improvements from the application of deep neural networks are believed to be attributable to their capability to learn hierarchically more complex features from large data-sets. Despite their excellent performance, the application of deep CNNs has been centered around image classification, which is computationally expensive when transferring to object detection. For example, the approach in [8] needs around 2 minutes to evaluate one image. Furthermore, their formulation of the problem does not take advantage of venerable and successful object detection frameworks such as DPM or Regionlets which are powerful designs for modeling object deformation, sub-categories and multiple aspect ratios.

The regionlets framework in object detection provides accurate generic object detection. Despite its great success, the features fed to this framework are still very low level features populated in previous literatures. On the other hand, the deep convolutional neural network (deep CNN) are well known as a powerful feature learning machine. Conventional methods apply a whole neural network for all possible object locations, leading to unaffordable computational cost. Typically, finding an object in an image costs several minutes or even hours.

SUMMARY

Systems and methods are disclosed for detecting an object in an image by determining convolutional neural network responses on the image; mapping the responses back to their spatial locations in the image; and constructing features densely extract shift invariant activations of a convolutional neural network to produce dense features for the image.

In implementations, the feature extraction computation for object candidates are shared and produces much better detection efficiency. We further augment these features with traditional hard-coded features. The features are complementary to each other and produce much better detection accuracy.

Advantages of the system may include one or more of the following. The system provides fast object detection using powerful neural network features and Regionlets object detection framework. Our system extracts shift invariant neural patterns from deep CNN and achieves excellent performance in object detection. The system is a new example of transfer learning, i.e transferring the knowledge learned from large-scale image classification (in this case, ImageNet image classification) to generic object detection. The system transfers the knowledge learned from a classification task to object detection by trickling high-level information in top convolutional layers in a deep CNN down to low-level image patches. As a result, a typical PASCAL VOC image only needs to run the neural network several times to produce DNPs for the whole image depending on the required feature stride, promising low computational cost for feature extraction. To adapt our features for the Regionlets framework, we build normalized histograms of DNPs inside each sub-region of arbitrary resolution within the detection window and add these histograms to the feature pool for the boosting learning process. DNPs can also be easily combined with traditional features in the Regionlets framework.

DESCRIPTION

Figure 1A:
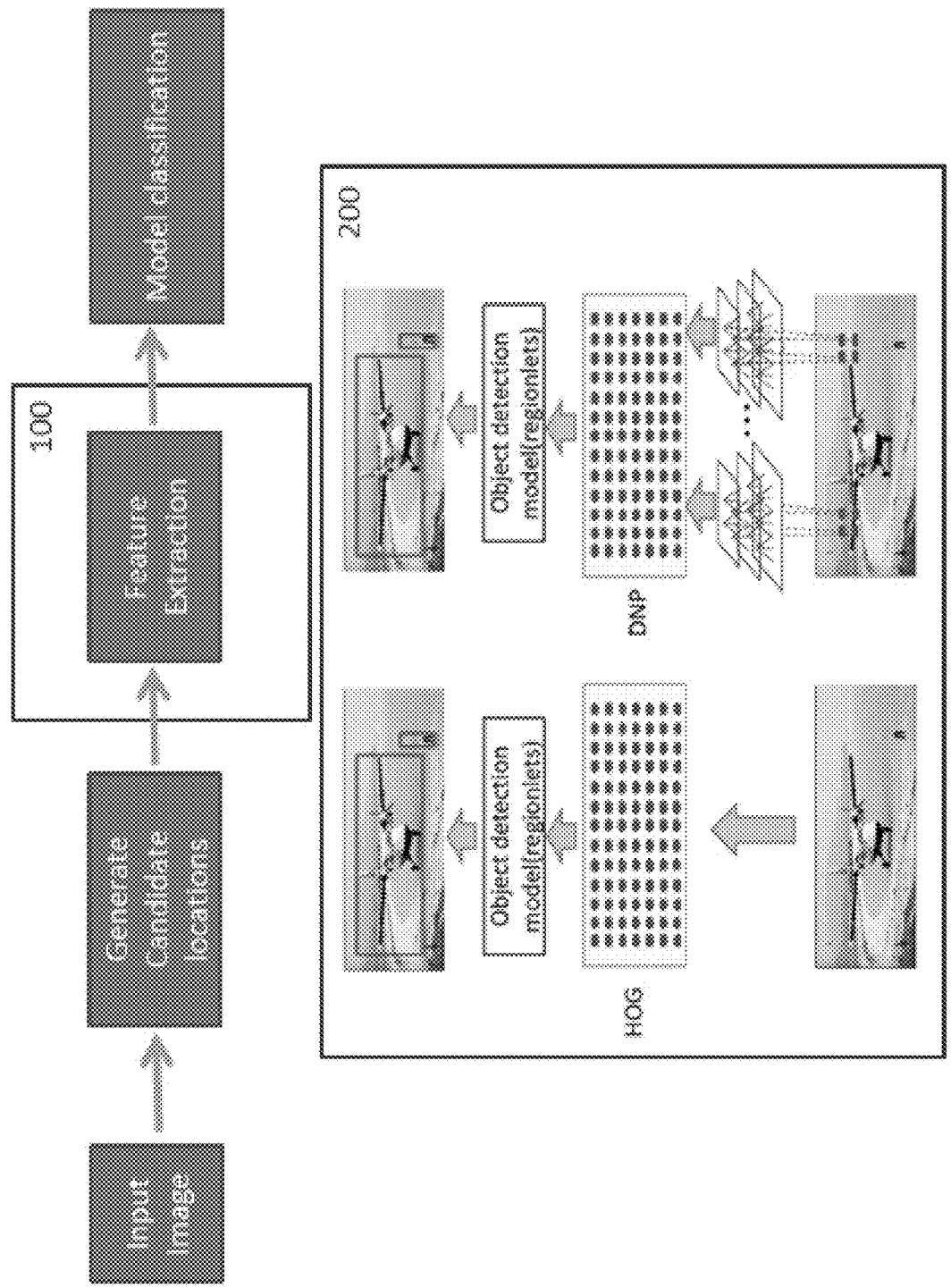
FIG. 1A shows an exemplary system with Regionlets with Shift Invariant Neural Patterns for Object Detection.
Figure 1B:
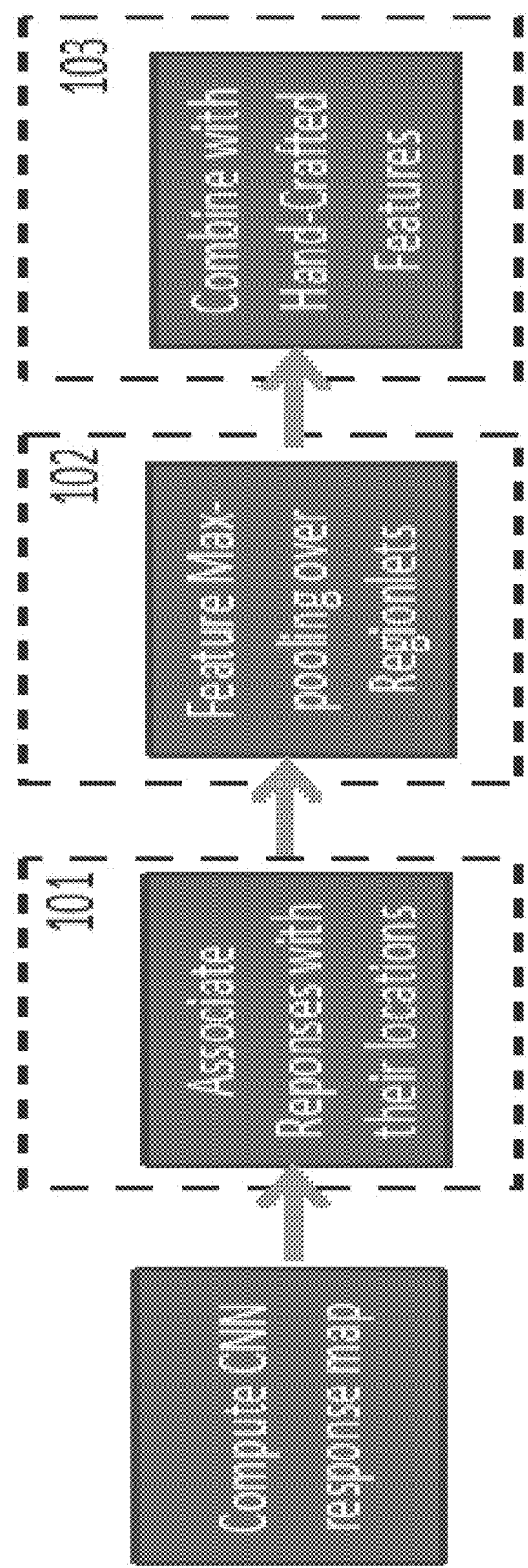
FIG. 1B shows in more details a feature extraction module of FIG. 1A.

FIG. 1A shows an exemplary system with Regionlets with Shift Invariant Neural Patterns for Object Detection, while FIG. 1B shows in more details a feature extraction module of FIG. 1A. As shown in FIGS. 1A and 1B, our object detection system first uses low-level segmentation to generate object hypothesis. Then we apply a trained object detector to each of the candidate. In contrast to extracting features for each candidate independently, we firstly densely generate features for the image. The base feature extraction computation is shared across different object candidates. The first row in the chart shows general object detection framework with several components such as object proposal generating and feature extraction. The second row in the chart shows our object detection framework. It incorporates CNN features into the traditional object detection framework.

The system efficiently incorporates a deep neural network into conventional object detection frameworks using the Dense Neural Pattern (DNP), a local feature densely extracted from an image with arbitrary resolution using a well-trained deep convolutional neural network. The DNPs not only encode high-level features learned from a large image data-set, but are also local and flexible like other dense local features (like HOG or LBP). It is easy to integrate DNPs into the conventional detection frameworks. More specifically, the receptive field location of a neuron in a deep CNN can be back-tracked to exact coordinates in the image. Spatial information of neural activations is preserved. Activations from the same receptive field but different feature maps can be concatenated to form a feature vector for the receptive field. These feature vectors can be extracted from any convolutional layers before the fully connected layers. Because spatial locations of receptive fields are mixed in fully connected layers, neuron activations from fully connected layers do not encode spatial information. The convolutional layers naturally produce multiple feature vectors that are evenly distributed in the evaluated image crop (a crop, for example). To obtain dense features for the whole image which may be significantly larger than the network input, we use 'network-convolution' which shifts the crop location and forward-propagate the neural network until features at all desired locations in the image are extracted.

In contrast to unsupervised pre-training, our system takes advantage of a large-scale supervised image classification model to improve object detection frameworks. The deep CNN is trained using image labels on an image classification task. Learning deep CNN in an unsupervised manner for our framework may also be done. The system is a new example of transfer learning, i.e transferring the knowledge learned from large-scale image classification (in this case, ImageNet image classification) to generic object detection. The system transfers the knowledge learned from a classification task to object detection by trickling high-level information in top convolutional layers in a deep CNN down to low-level image patches.

As a result, a typical PASCAL VOC image only needs to run the neural network several times to produce DNPs for the whole image depending on the required feature stride, promising low computational cost for feature extraction. To adapt our features for the Regionlets framework, we build normalized histograms of DNPs inside each sub-region of arbitrary resolution within the detection window and add these histograms to the feature pool for the boosting learning process. DNPs can also be easily combined with traditional features in the Regionlets framework.

Our experiments show that the proposed DNPs are very effective and also complementary to traditional features. On PASCAL 2007 VOC detection benchmark, our framework with Regionlets and DNPs achieved 46.1% mAP compared to 41.7% with the original Regionlets; on PASCAL VOC 2010, it achieves 44.1% mAP compared to 39.7% with the original Regionlets. It outperforms the recent approach by [8] with 43.5% mAP. Furthermore, our DNP features are extracted from the fifth convolutional layer of the deep CNN without fine-tuning on the target data-set, while [8] used the seventh fully connected layer with fine-tuning. Importantly, for each PASCAL image, our feature extraction finishes in 2 seconds, compared to approximately 2 minutes from our replication of [8].

Our method incorporates a discriminatively-trained deep neural network into a generic object detection framework. This approach is very effective and efficient when applied to the Regionlets object detection framework and achieved competitive and state-of-the-art performance on the PASCAL VOC datasets.

As indicated in 100, the method includes a shift invariant way to extract CNN features with spatial location information. The second contribution (200) is the Regionlets detection framework with CNN and traditional features. The feature extraction has following steps:

1) Apply neural network forward propagation over the image multiple times with a stride of 80 by 80 pixels.
2) Map the responses from the fifth convolutional layer back to their original spatial location (101)
3) Do the max-pooling for responses falling into the same regionlet (102)
4) These neural network features are put together in a pool with traditional features for further boosting feature learning (103).

We extract CNN features with spatial information which is critical for object detection (100). It has never been achieved before our invention. The system integration with traditional features into a unified framework (200) improves the detection performance significantly. It is also new to the community.

Figure 1C:
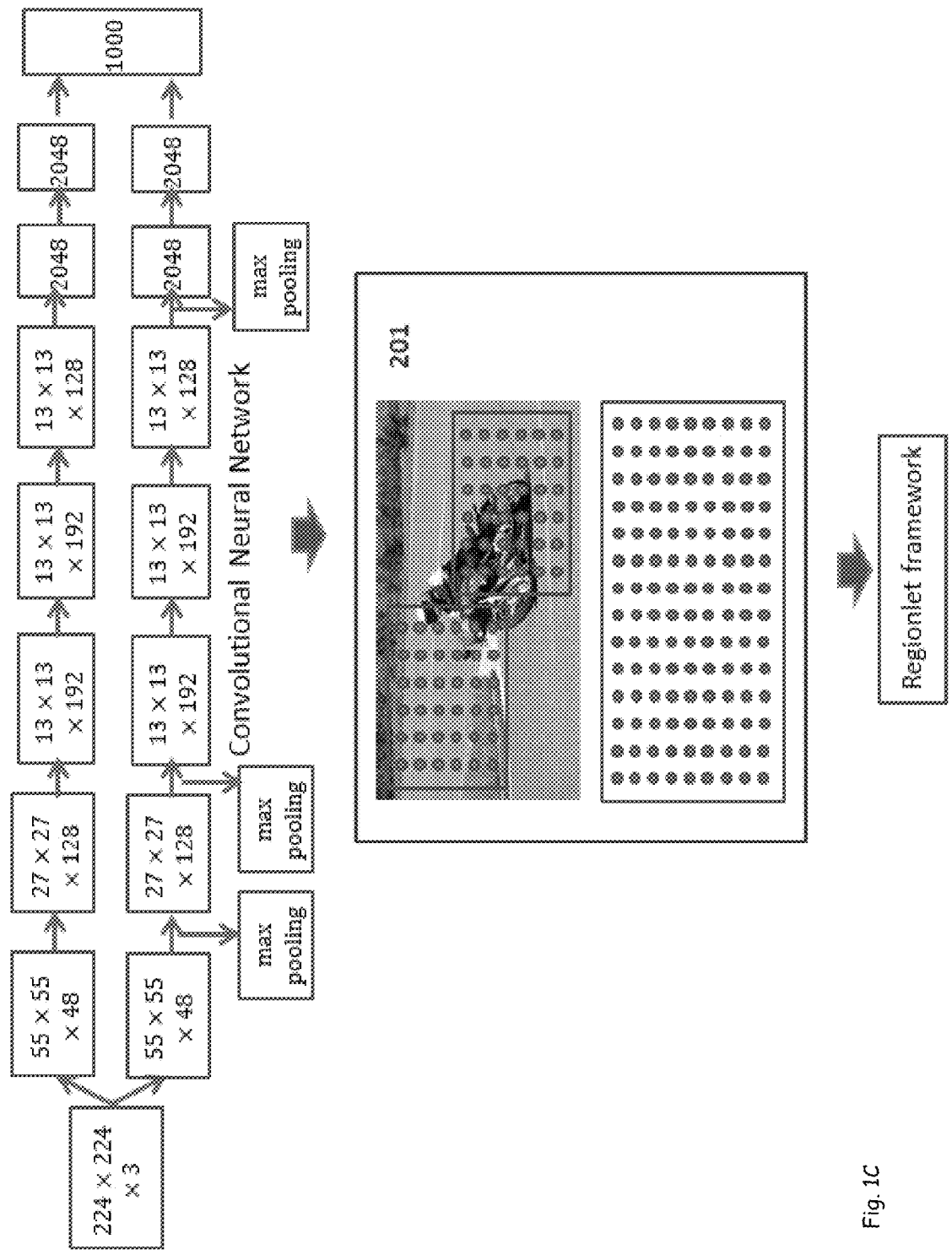
FIG. 1C shows an exemplary computer Regionlets with Shift Invariant Neural Patterns for Object Detection.

FIG. 1C shows another embodiment with a convolution neural network. As indicated in 201, our system uses a shift invariant way to extract CNN features for the regionlet framework. We apply the deep convolutional neural networks (deep CNN) model to a target image densely, Instead of using all the CNN features extracted, we only extract features in the center of the model. Because features lie on the boundary of the model are convolved with paddings, while features in the center of the model are convolved with effective pixel regions. The different convolution behavior caused inconsistency in feature extraction. Our approach extracts features in a consistent way. If we shift one image patch from one position to another, our approach will produce the same features.

Next, we first introduce the neural network used to extract dense neural patterns, Then we provide detailed description of our dense feature extraction approach. Finally, we illustrate the techniques to integrate DNP with the Regionlets object detection framework.

Deep neural networks offer a class of hierarchical models to learn features directly from image pixels. Among these models, deep convolutional neural networks (CNN) are constructed assuming locality of spatial dependencies and stationarity of statistics in natural images. The architecture of CNNs gives rise to several unique properties desirable for object detection. Firstly, each neuron in a deep CNN corresponds to a receptive field whose projected location in the image can be uniquely identified. Thus, the deeper convolutional layers implicitly capture spatial information, which is essential for modeling object part configurations. Secondly, the feature extraction in a deep CNN is performed in a homogeneous way for receptive fields at different locations due to convolutional weight-tying. More specifically, different receptive fields with the same visual appearance produce the same activations. This is similar to a HOG feature extractor, which produces the same histograms for image patches with the same appearance. Other architectures such as local receptive field networks with untied weights or fully-connected networks do not have these properties. Not only are these properties valid for a one-layer CNN, they are also valid for a deep CNN with many stacked layers and all dimensions of its feature maps. By virtue of these desirable properties, we employ the deep CNN architecture. We build a CNN with five convolutional layers inter-weaved with max-pooling and contrast normalization layers as illustrated in FIG. 2.

Figure 2:
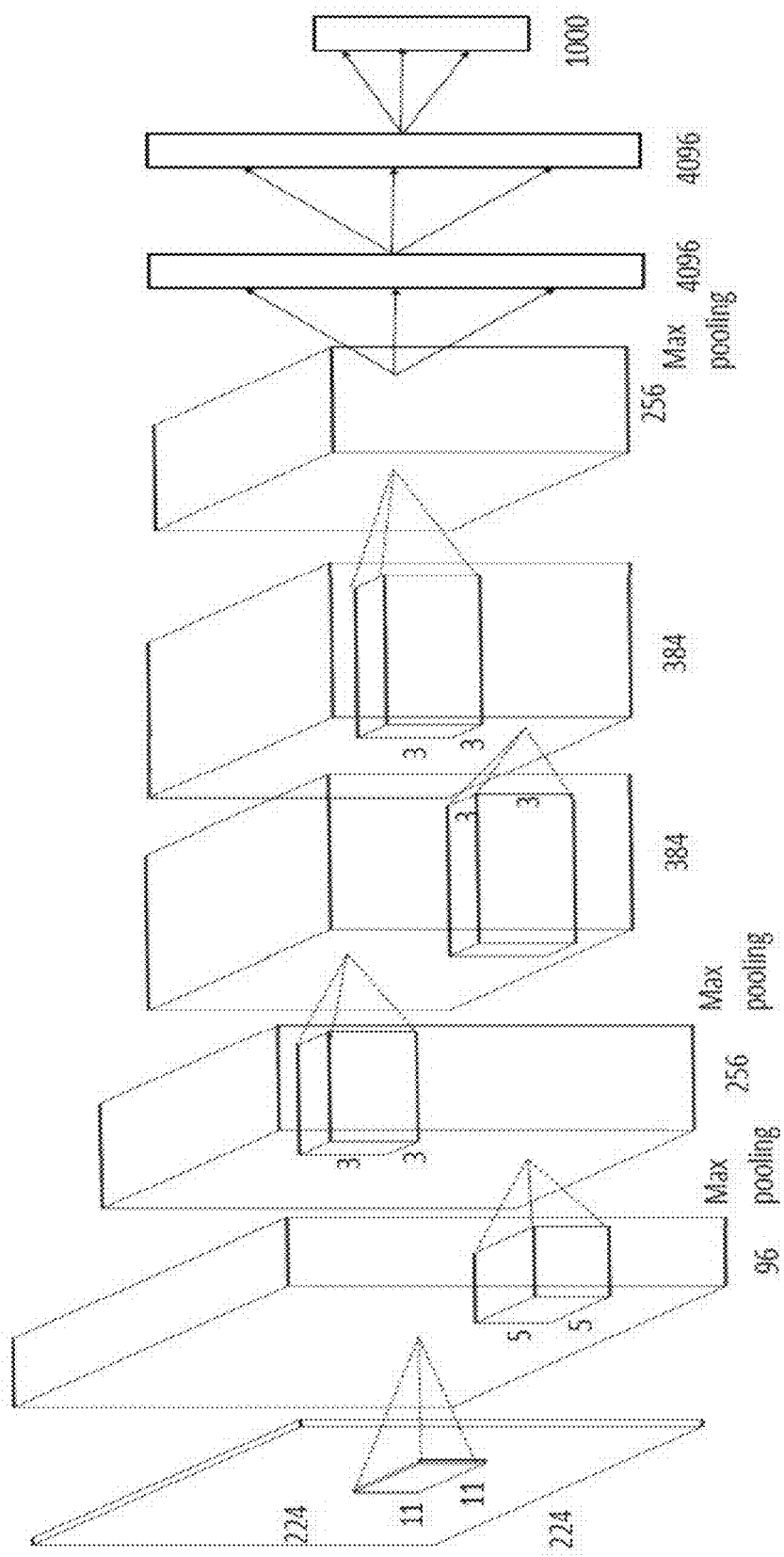
FIG. 2 shows an exemplary deep convolutional neural network for extracting dense neural patterns.

FIG. 2 shows an exemplary architecture of the deep convolutional neural network for extracting dense neural patterns. We did not separate the network into two columns, and our network has a slightly larger number of parameters. The deep CNN is trained on large-scale image classification with data from ILSVRC 2010. To train the neural network, we adopt stochastic gradient descent with momentum as the optimization technique, combined with early stopping. To regularize the model, we found it useful to apply data augmentation and the dropout technique. Although the neural network we trained has fully connected layers, we extract DNPs only from convolutional layers since they preserve spatial information from the input image.

After the deep CNN training on large-scale image classification, the recognition module is employed to produce dense feature maps on high-resolution detection images. We call the combination of this technique and the resulting feature set Dense Neural Patterns (DNPs).

Figure 3:
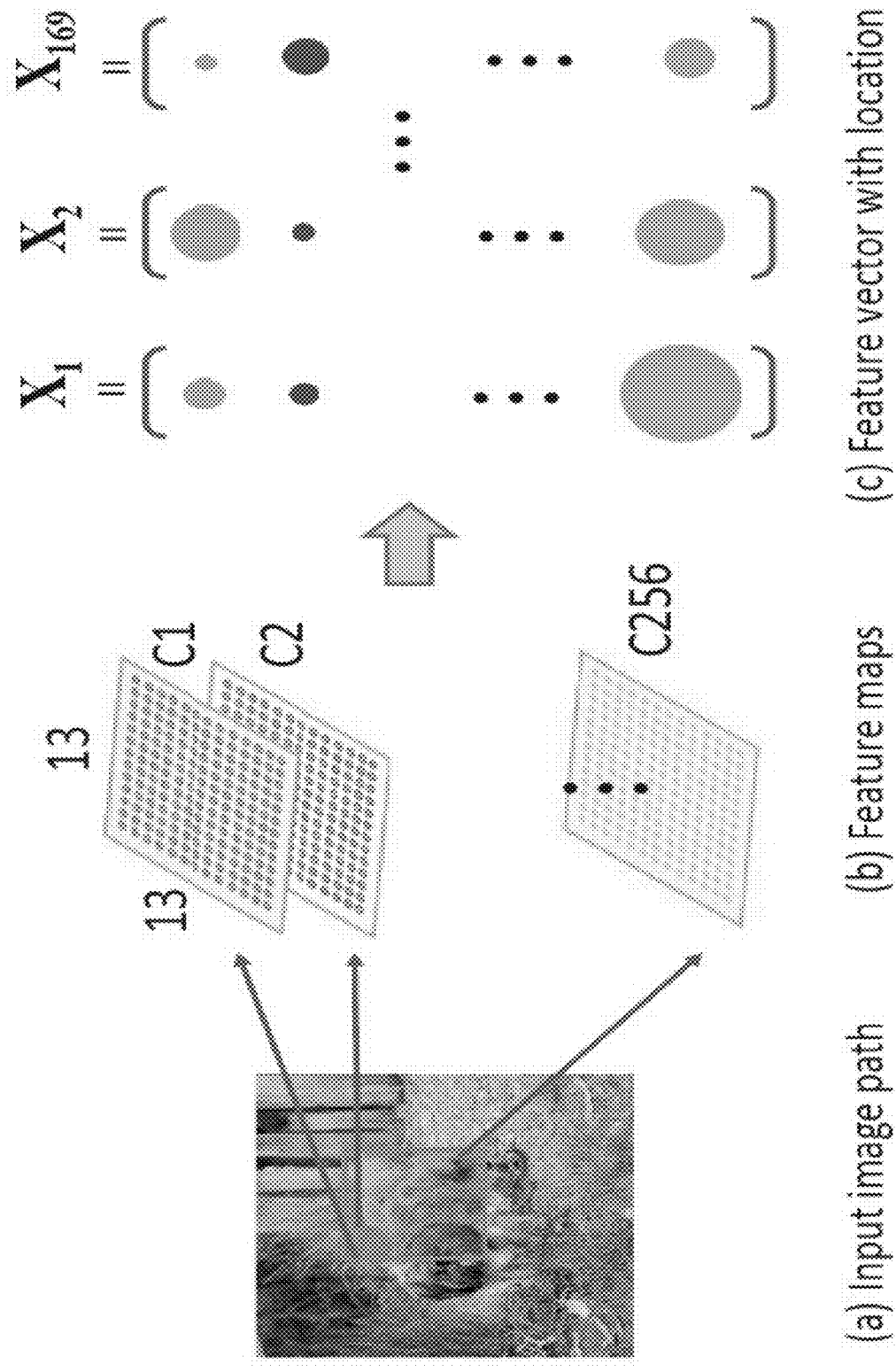
FIG. 3 shows exemplary neural patterns associate with location association.
Figure 4:
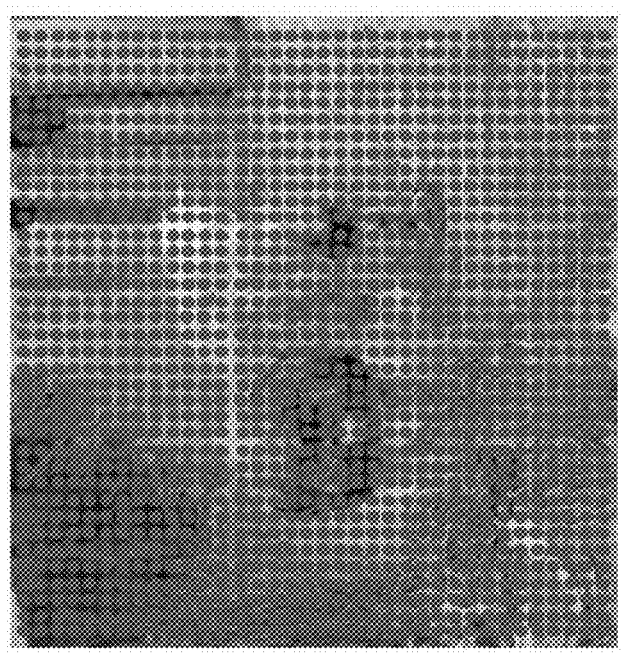
FIG. 4 shows exemplary dense feature maps obtained by shifting the classification window and extract neural patterns at center positions.
Figure 4:
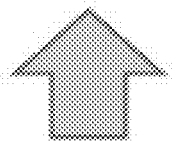
Figure 4:
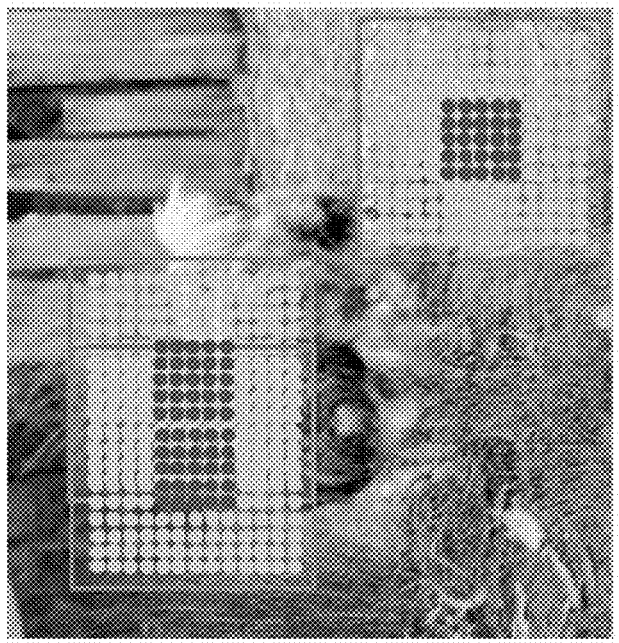

The main idea for extracting dense neural pattern is illustrated in FIG. 3 and FIG. 4. In the following paragraphs, we first describe the methodologies to extract features using a deep CNN on a single image patch. Then, we describe the geometries involved in applying "network-convolution" to generate dense neural patterns for the entire high-resolution image.

Each sub-slice of a deep CNN for visual recognition is commonly composed of a convolutional weight layer, a possible pooling layer, and a possible contrast-normalization layer. All three layers could be implemented by convolutional operations. Therefore, seen from the perspective of preserving the spatial feature locations, the combination of these layers could be perceived as one convolutional layer with one abstracted kernel. The spatial location of the output can be traced back by the center point of the convolution kernel.

FIG. 3 shows exemplar neural patterns extraction with location association:

(a) A square region (224×224) as the input for the deep neural network.

(b) Feature maps generated by filters in the fifth convolution layer, spatially organized according to their inherited 2-D locations. Each map has 13×13 neural patterns.

(c) Feature vector generated for each feature point. A bigger circle indicates a larger neural activation.

As shown in FIG. 3(b), each convolution kernel produces a sheet of neural patterns. To tailor dense neural patterns into a flexible feature set for object detectors, we compute the 2-D location of each neural pattern and map it back to coordinates on the original image. As an example, we show how to compute the location of the top-left neural pattern in FIG. 3(b). The horizontal location x of this top-left neural pattern feature is computed with Equation 1:

$$x_i = x_{i-1} + \left(\frac{W_i - 1}{2} - P_i\right)S_{i-1} \quad (1)$$

where i>1, $$x_1 = \frac{W_i - 1}{2},$$

$x_{i-1}$ is the top-left location of the previous layer, $W_i$ is the window size of a convolutional or pooling layer, $P_i$ is the padding of the current layer, $S_{i-1}$ is the actual pixel stride of two adjacent neural patterns output by the previous layer which can be computed with Equation 2

$$S_i = S_{i-1} \times s_i. \quad (2)$$

Here $s_i$ is the current stride using neural patterns output by previous layers as "pixels". Given equation 1 and equation 2, the pixel locations of neural patterns in different layers can be computed recursively going up the hierarchy. Table 1 shows a range of geometric parameters, including original pixel x coordinates of the top-left neural pattern and the pixel stride at each layer. Since convolutions are homogeneous in x and y directions, the y coordinates can be computed in a similar manner. Coordinates of the remaining neural patterns can be easily computed by adding a multiple of the stride to the coordinates of the top-left feature point. To obtain a feature vector for a specific spatial location (x,y), we concatenate neural patterns located at (x,y) from all maps (neurons) as illustrated in FIG. 3(c).

Table 1 shows exemplary computations of the actual location $x_i$ of the top-left neural pattern and the actual pixel distance $S_i$ between two adjacent neural patterns output by layer i, based on our deep CNN structure.

| i | Layer | $W_i$ | $s_i$ | $P_i$ | $S_i$ | $x_i$ |
|---|-------|-------|-------|-------|-------|-------|
| 1 | conv1 | 11 | 4 | 1 | 4 | 6 |
| 2 | pool1 | 3 | 2 | 0 | 8 | 10 |
| 3 | conv2 | 5 | 1 | 2 | 8 | 10 |
| 4 | pool2 | 3 | 2 | 0 | 16 | 18 |
| 5 | conv3 | 3 | 1 | 1 | 16 | 18 |
| 6 | conv4 | 3 | 1 | 1 | 16 | 18 |
| 7 | conv5 | 3 | 1 | 1 | 16 | 18 |
| 8 | pool3 | 3 | 2 | 0 | 32 | 34 |

Now that a feature vector can be computed and localized, dense neural patterns can be obtained by "network-convolution". This process is shown in FIG. 4 where dense feature maps obtained by shifting the classification window and extract neural patterns at center positions. Producing dense neural patterns to a high-resolution image could be trivial by shifting the deep CNN model with 224×224 input over the larger image. However, deeper convolutional networks are usually geometrically constrained. For instance, they require extra padding to ensure the map sizes and borders work with strides and pooling of the next layer. Therefore, the activation of a neuron on the fifth convolutional layer may have been calculated on zero padded values. This creates the inhomogeneous problem among neural patterns, implying that the same image patch may produce different activations. Although this might cause tolerable inaccuracies for image classification, the problem could be detrimental to object detectors, which is evaluated by localization accuracy. To rectify this concern, we only retain central 5×5 feature points of the feature map square. In this manner, each model convolution generates 25 feature vectors with a 16×16 pixel stride. In order to produce the dense neural patterns map for the whole image using the fifth convolutional layer, we convolve the deep CNN model every 80 pixels in both x and y direction. Given a 640×480 image, it outputs 40×30 feature points which involves 8×6 model convolutions.

The DNP feature representation has some desirable characteristics which make it substantially different from and complementary to traditional features used in object detection.

Robustness to Boundary Effects Caused by Local Shifts is Discussed Next.

Most hand-crafted features are not robust to local shifts due to the hard voting process. Given HOG for example, gradient orientations are hard voted to spatial (8×8) histograms. Features close to the boundary of two feature regions may be in one region on one example, but the other on another example which causes substantial feature representation change. The boundary effects may cause difficulties in robust detection. Moreover, if we shift the window by 8 pixels, extracted features are completely misaligned. On the contrary, the max-pooling in DNPs explicitly handles reasonable pixel shifts. The dense convolution with shared weights, the data driven learned invariance also implicitly further improve the robustness to boundary effects and local shifts.

Figure 5:
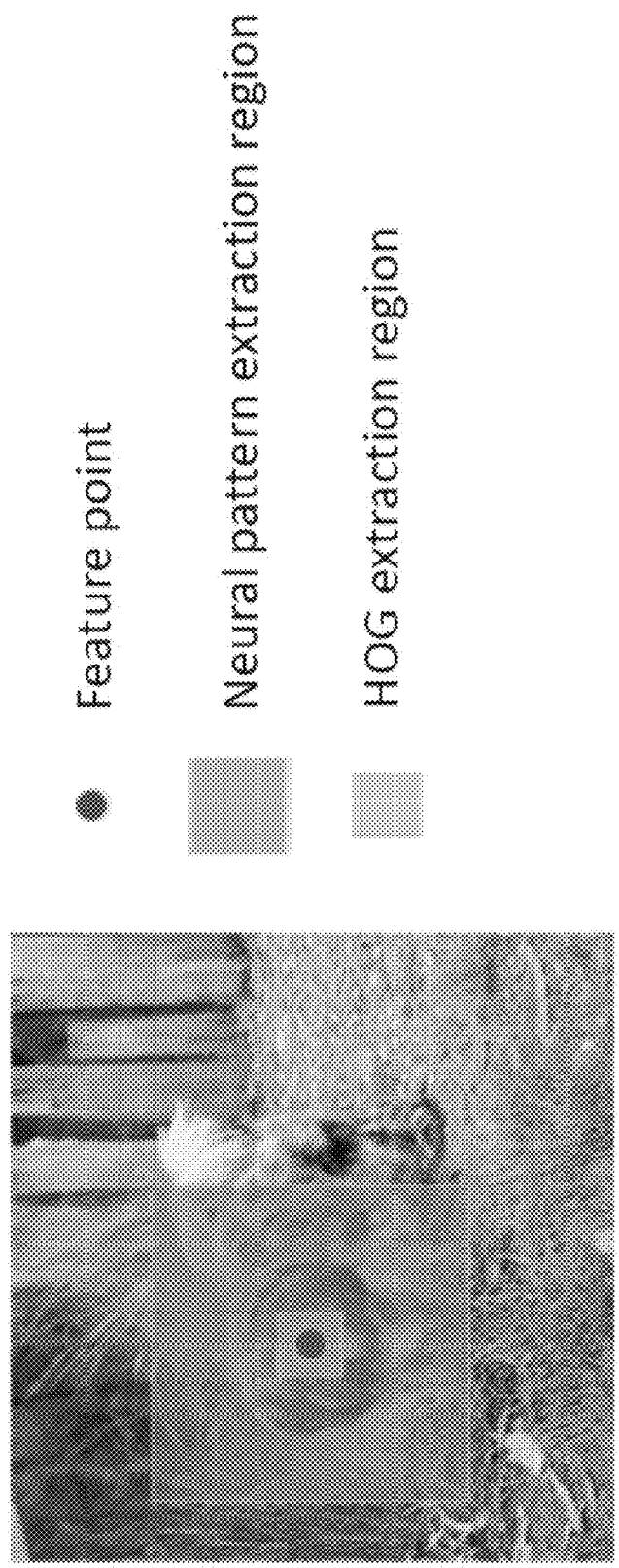
FIG. 5 shows exemplary long-range features for detection from higher layers of convolutional networks.

FIG. 5 shows long-range features for detection from higher layers of convolutional networks: the blue circle shows the feature point at which we want to extract features. The yellow patch shows the area where HOG features are built (usually 8×8). The green patch is the receptive field from which the deep net features are extracted (163×163 for the fifth convolutional layer).

Local Features with High-Level Information are Generated by the System.

Figure 7:
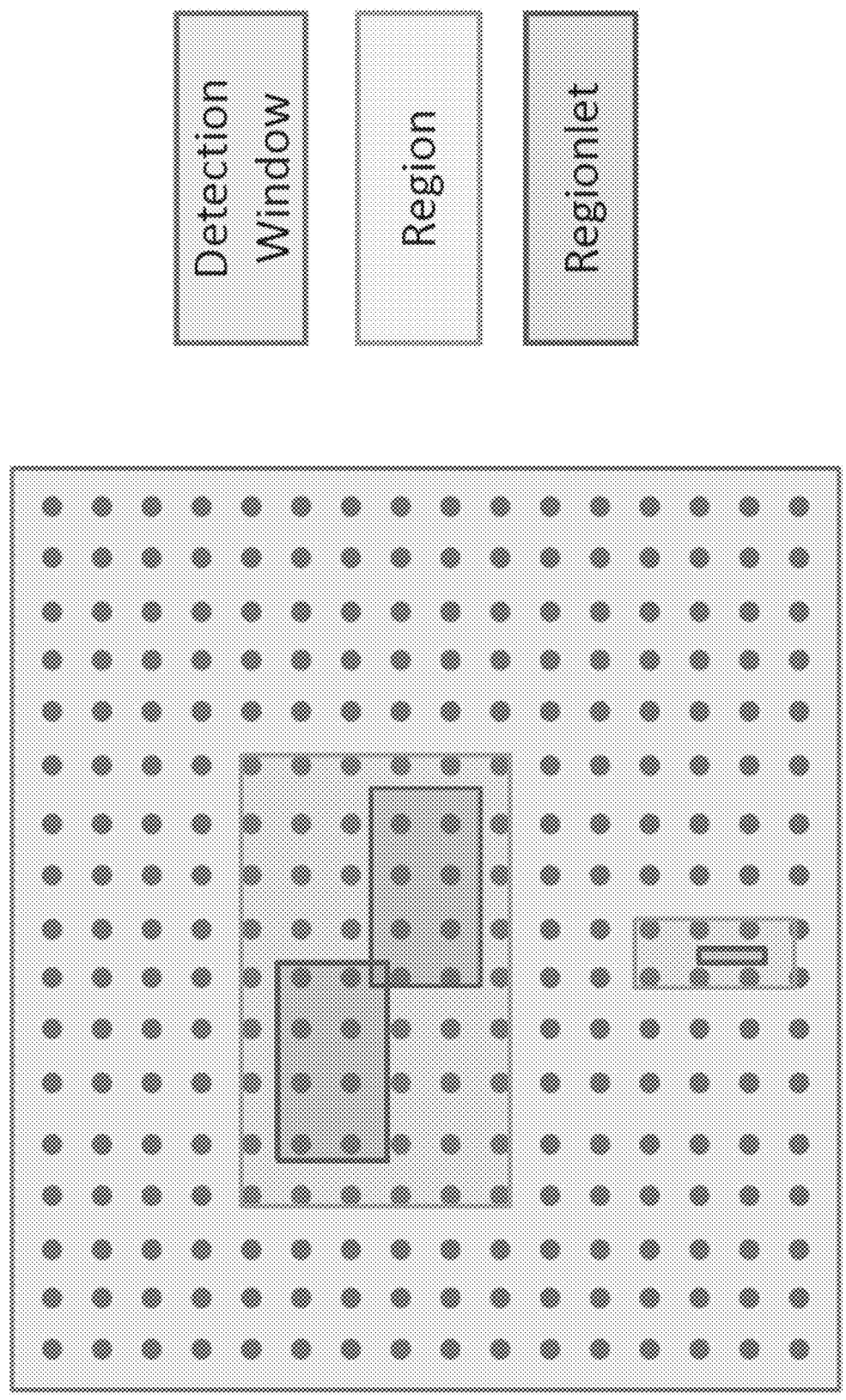
FIG. 7 shows an illustration of feature points, a detection window, regions, and regionlets.

Another significant advantage of DNPs is that the hierarchical architecture of CNNs offers high-level visual features. More specifically, the features are indicative of object-level or object-part level visual input. To validate this, we find the image patches that causes large responses to a selected neural pattern dimension in the deep layers of the CNN. This visualization is shown in FIG. 7. It suggests that patches which have large feature responses to the same neural pattern dimension correspond to similar object category, color or contour. In this respect, DNPs offers significant advantages over traditional features for object detection. Details about the visualization can be found in Sec. 4.2.

Long-Range Context Modeling

From lower to higher layers, DNP features cover increasingly larger receptive fields. On the fifth layer, each neuron is responsive to a spatial area of 163×163 pixels in the input image. The features in this layer reacts to appearances of much larger scale as compared to hand-designed local features like HOG for object detection as shown in FIG. 5. The long-range effect of the significantly larger context area is beneficial. It is analogous to long-range effects which were shown to improve localization [3] and image segmentation [18].

Next, Regionlets with Local Histograms of Dense Neural Patterns are Detailed.

The Regionlets object detection framework learns cascaded boosting classifiers to detect objects of interest. The object searching space is defined using segmentation cues. The approach employs candidate bounding boxes from Selective Search. Given an image, candidate boxes, i.e, object hypothesis are proposed using low-level segmentation cues. The Regionlets approach employs boosting classifier cascades as the window classifier. The input to each weak classifier is a one-dimensional feature from an arbitrary region R. The flexibility of this framework emerges from max-pooling features from several sub-regions inside the region R. These sub-regions are named Regionlets. In the learning process, the most discriminative features are selected by boosting from a large feature pool. It naturally learns deformation handling, one of the challenges in generic object detection. The Regionlets approach offers the powerful flexibility to handle different aspect ratios of objects. The algorithm is able to evaluate any rectangular bounding box. This is because it removes constraints that come with fixed grid-based feature extraction.

Figure 6:
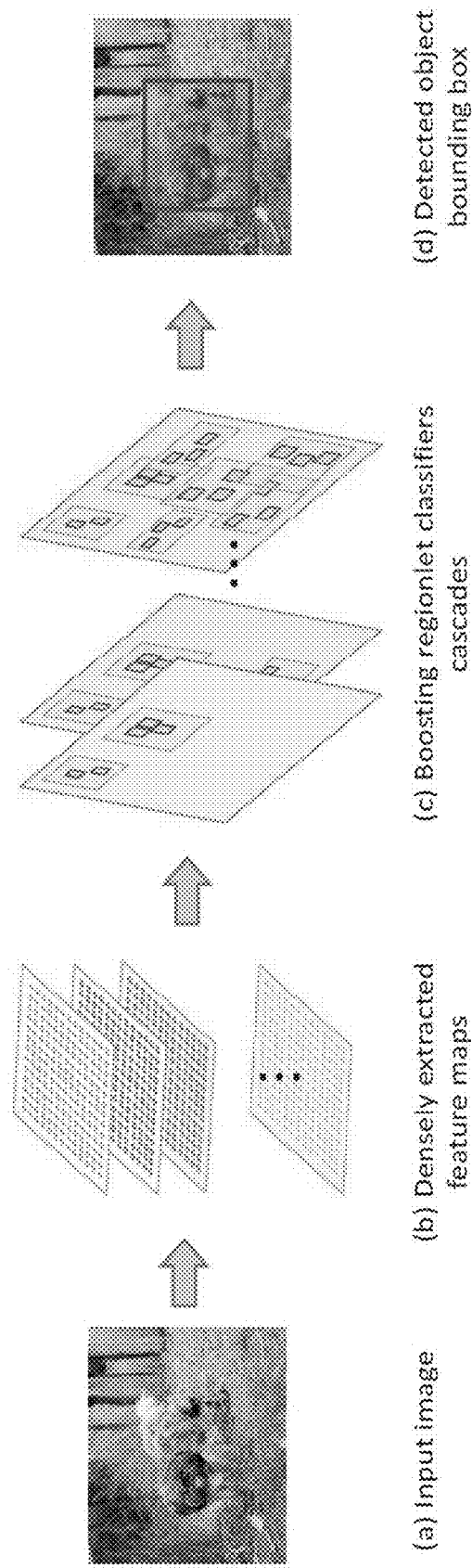
FIG. 6 shows Regionlets object detection framework. It learns cascaded boosting classifiers to detect objects of interest.

The dense neural patterns introduced above encode high-level features from a deep CNN at specific coordinates on the detection image. This makes them a perfect set of features for the Regionlets framework. The basic feature construction unit in the Regionlets detection model, i.e a regionlet, varies in scales and aspect ratios. At the same time, the deep neural patterns from an image are extracted using a fixed stride which leads to evenly distributed feature points in both horizontal and vertical directions. As illustrated in FIG. 6, a regionlet can cover multiple feature points or no feature point. The illustration of FIG. 6 shows feature points, a detection window, regions, and regionlets. Blue points represent dense neural patterns extracted in each spatial location. FIG. 6 shows that a regionlet can spread across multiple feature points, or no feature point.

To obtain a fixed length visual representation for a regionlet of arbitrary resolution, we build a local DNP histogram, or average pooling of DNPs, inside each regionlet. Denote DNPs in a regionlet r as $\{x_i | i \in (1, \ldots N_r)\}$, where i indicates the index of the feature point, $N_r$ is the total number of feature points in regionlet r. The final feature for r is computed as:

$$x = \frac{1}{N_r} \sum_{i=1}^{N_r} x_i. \tag{3}$$

Each dimension of the deep neural patterns corresponds to a histogram bin and their values from different spatial locations are accumulated inside a regionlet. The histograms are normalized using L-0 norm. While most histogram features define a fixed spatial resolution for feature extraction, our definition allows for a histogram over a region of arbitrary shape and size. Max-pooling is performed among regionlets to handle local deformations.

To incorporate DNP into the Regionlets detector learning framework, in which the weak learner is based on a 1-D feature, we uniformly sample the DNP×Regionlets configuration space to construct the weak classifier pool. Each configuration specifies the spatial configuration of Regionlets as well as the feature dimension of DNP. Because the representation is 1-D, the generated feature pool can be easily augmented to the pool of other features such as HOG, LBP or Covariance.

Constructing DNP feature representations for other template-based detectors (similar as HOG template) is fairly simple. Naturally we just need to concatenate all DNPs in the detection window. The features can also be directly applied to the Deformable Part-based Model by replacing the HOG features with the 256 dimensional neural patterns.

The foregoing system provides a framework to incorporate a discriminatively trained deep convolutional neural network into generic object detection. It is a fast effective way to enhance existing conventional detection approaches with the power of a deep CNN. Instantiated with Regionlets detection framework, we demonstrated the effectiveness of the proposed approach on public benchmarks. We achieved comparable performance to state-of-the-art with 74 times faster speed on PASCAL VOC datasets. We also show that the DNPs are complementary to traditional features used in object detection. Their combination significantly boosts the performance of each individual feature.

Figure 8:
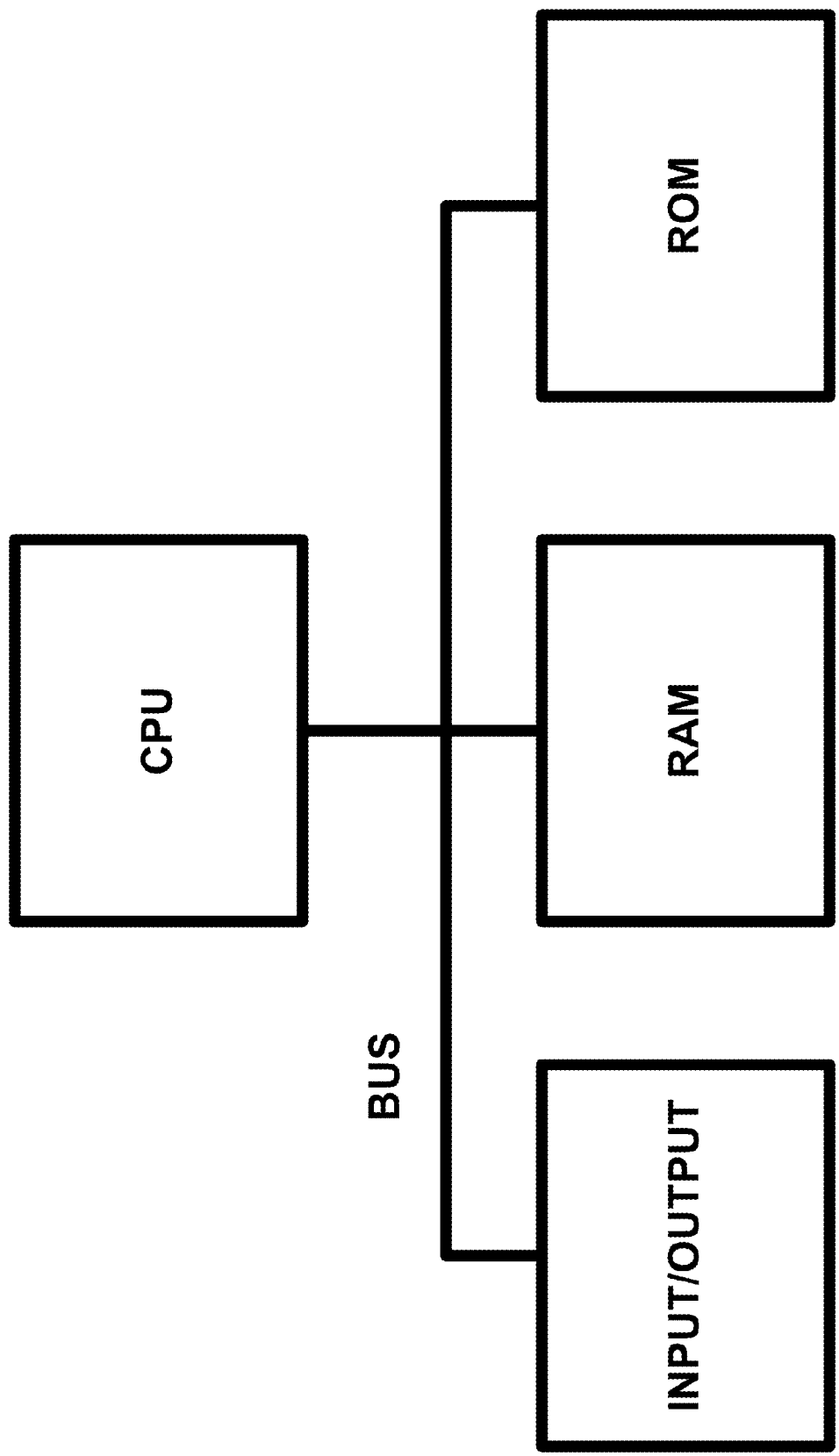
FIG. 8 shows an exemplary computer for object detection.

FIG. 8 shows an exemplary computer for Object Detection. The system may be implemented in hardware, firmware or software, or a combination of the three. Preferably the system is implemented in a computer program executed on a programmable computer having a processor, a data storage system, volatile and non-volatile memory and/or storage elements, at least one input device and at least one output device.

Each computer program is tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

The invention has been described herein in considerable detail in order to comply with the patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A method for detecting an object in an image, comprising:
   determining convolutional neural network responses on the image;
   mapping the responses back to their spatial locations in the image;
   constructing features densely extract shift invariant activations of a convolutional neural network to produce dense features for the image; and
   determining a horizontal location x of a neural pattern feature as:

$$x_i = x_{i-1} + \left(\frac{W_i - 1}{2} - P_i\right)S_{i-1}$$

where i>1, $$x_1 = \frac{W_i - 1}{2},$$

$x_{i-1}$ is a top-left location of a previous layer, $W_i$ is the window size of a convolutional or pooling layer, $P_i$ is a padding of a current layer, $S_{i-1}$ is actual pixel stride of two adjacent neural patterns output by the previous layer.

2. The method of claim 1, comprising sharing feature extraction computation for object candidates.

3. The method of claim 1, comprising augmenting the features with hard-coded features.

4. The method of claim 1, comprising densely extract shift invariant activations of a convolutional neural network trained on an image database.

5. The method of claim 1, comprising feeding the features to a Regionlets framework.

6. The method of claim 5, comprising using a boosting procedure to choose effective features.

7. The method of claim 1, comprising determining:

$$S_i = S_{i-1} \times s_i,$$

where $s_i$ is a current stride using neural patterns output by the previous layers as pixel; and determining pixel locations of neural patterns in different layers recursively by going up the hierarchy.

8. The method of claim 1, comprising determining a fixed length visual representation for a regionlet of arbitrary resolution.

9. The method of claim 8, comprising generating a local Dense Neural Patterns (DNPs) histogram, or average pooling of DNPs, inside each regionlet.

10. The method of claim 9, comprising generating DNPs in a regionlet r as $\{x_i | i \delta(1, \ldots N_r)\}$, where i indicates the index of the feature point, $N_r$ is the total number of feature points in regionlet r and determining a final feature for r as:

$$x = \frac{1}{N_r} \sum_{i=1}^{N_r} x_i.$$

11. The method of claim 9, wherein each dimension of deep neural patterns corresponds to a histogram bin and their values from different spatial locations are accumulated inside a regionlet, comprising normalizing histograms using L-0 norm.

12. The method of claim 9, comprising incorporating DNP into a Regionlets detector learning framework.

13. The method of claim 9, comprising applying a weak learner based on a 1-D feature, and uniformly sample DNP Regionlets configuration space to construct a weak classifier pool.

14. The method of claim 13, wherein the generated feature pool is easily augmented to the pool of other features including HOG, LBP or Covariance.

15. The method of claim 9, wherein each configuration specifies a spatial configuration of Regionlets and feature dimension of the DNP.

16. A system for detecting an object in an image, comprising:
   a processor for carrying out the following means:
   means for determining convolutional neural network responses on the image;
   means for mapping the responses back to their spatial locations in the image;
   means for constructing features densely extract shift invariant activations of a convolutional neural network to produce dense features for the image; and
   determining a horizontal location x of a neural pattern feature as:

$$x_i = x_{i-1} + \left(\frac{W_i - 1}{2} - P_i\right)S_{i-1}$$

where i>1, $$x_1 = \frac{W_1 - 1}{2},$$

$x_{i-1}$ is a top-left location of a previous layer, $W_i$ is the window size of a convolutional or pooling layer, $P_i$ is a padding of a current layer, $S_{i-1}$ is actual pixel stride of two adjacent neural patterns output by the previous lave.

17. The system of claim 16, comprising means for sharing feature extraction computation for object candidates.

18. The system of claim 16, comprising means for augmenting the features with hard-coded features.

19. The system of claim 16, comprising means for densely extract shift invariant activations of a convolutional neural network trained on an image database.

* * * * *